3,597,400
SYNTHETIC LINEAR TRANSPARENT
POLYAMIDES
Yoshikazu Kashiro, Ryouzo Takada, Takaya Yasumoto,
and Masakazu Inoue, Nagoya-shi, Japan, assignors to
Toyo Rayon Kabushiki Kaisha, Tokyo, Japan
Filed June 30, 1969, Ser. No. 837,618
Claims priority, application Japan, July 2, 1968,
43/45,619
Int. Cl. C08g 20/20
U.S. Cl. 260—78R
2 Claims

ABSTRACT OF THE DISCLOSURE

Synthetic linear polyamide consisting essentially of a polycondensate from substantially equimolar amounts of a diamine component consisting of bis(4-aminocyclohexyl)methane and hexamethylene diamine, and a dicarboxylic component consisting of terephthalic acid and isophthalic acid, the composition ratio of the diamine component and the dicarboxylic acid component being within a specific range and said polyamide having a relative viscosity $\eta_{rel.}$, measured in a solution of 1 g. of the polyamide in 100 cc. of 98% concentrated sulfuric acid at 25° C., of at least 1.9, and process for preparation thereof.

---

This invention relates to synthetic linear polyamide excellent in transparency, chemical resistance and melt shapeability and exhibiting a high softening temperature, and to a process for the preparation thereof. More detailedly, it relates to polyamides obtained by polycondensing bis(4-aminocyclohexyl)methane and hexamethylene diamine as diamine component with isophthalic acid and terephthalic acid as dicarboxylic acid component while maintaining the composition of these components within a specific range, and to a process for the preparation of such polyamides.

There have been heretofore proposed various methods for preparing transparent polyamides to be used as highly polymeric materials for preparing plastic shaped articles such as films, pipes, rods and containers by melt shaping. As one of such known methods there is exemplified a method using bis(4-aminocyclohexyl)methane as diamine component and polycondensing it with isophthalic acid (U.S. Pat. No. 2,696,482), although polyamides obtained in accordance with this method are excellent in transparency, they have a defect of an extremely high melt viscosity, resulting in difficulties of shaping thereof in a customary manner. A method was also proposed using a combination of terephthalic acid and isophthalic acid as dicarboxylic acid component, and polycondensing an alkyl group-containing hexamethylene diamine with the combination of phthalic acids to form side chains thereof. However, polyamides obtained in accordance with this method have a defect of a poor resistance to an organic solvent such as methanol.

In other words, transparent polyamides heretofore proposed have some defects or other in chemical resistance, softening temperature and melt shapeability, and no transparent polyamides satisfactory in all of these properties have been heretofore known.

We have found that polyamides having a preferable combination of transparency, chemical resistance, softening temperature and melt shapeability can be obtained by selecting bis(4-aminocyclohexyl)methane and hexamethylene diamine as diamine component monomers of polyamides and terephthalic acid and isophthalic acid as dicarboxylic acid component monomers, and polycondensing these four monomers at specific ratios which will be described below.

More specifically, this invention is to provide synthetic linear polyamides consisting essentially of a polycondensate from substantially equimolar amounts of a diamine component consisting of bis(4-aminocyclohexyl)methane and hexamethylene diamine, and a dicarboxylic acid component consisting of terephthalic acid and isophthalic acid, the composition ratio of the diamine component and the dicarboxylic acid component being within a range specified by the following formulas $$x \leq 50 \quad \text{(I)}$$
$$y \leq 10x \quad \text{(II)}$$
$$y \leq 0.2x + 80 \quad \text{(III)}$$

and $$y \geq 0.4x + 30 \quad \text{(IV)}$$

wherein $x$ stands for the mole percentage of bis(4-aminocyclohexyl)methane in the diamine component and $y$ stands for the mole percentage of isophthalic acid in the dicarboxylic acid component, and said polyamides having a relative viscosity $\eta_{rel.}$, measured in a solution of 1 g. of the polyamide in 100 cc. of 98% concentrated sulfuric acid at 25° C., of at least 1.9.

For a better illustration of the present invention the description will be given hereinbelow with reference to the accompanying drawings.

The drawings illustrate a graph showing the ratio of the diamine and dicarboxylic acid components in the polyamide of the present invention, wherein the abscissa $x$ denotes the mole percentage of bis(4-aminocyclohexyl)methane in the diamine component, namely $$\frac{ACM}{ACM + A_6} \times 100$$

in which ACM stands for the mole number of bis(4-aminocyclohexyl)methane and $A_6$ stands for the mole number of hexamethylenediamine, and the ordinate $y$ denotes the mole percentage of isophthalic acid in the dicarboxylic acid component, namely $$\frac{I}{T+I} \times 100$$

in which I stands for the mole number of isophthalic acid and T stands for the mole number of terephthalic acid.

The range of the ratio of each component in the polyamide of this invention corresponds to a zone surrounded by lines AB, CD, AD and BC and denoted by oblique lines. The lines AB, CD, AD and BC are defined by the following linear functions, respectively;

$$AB: x = 50$$
$$CD: y = 10x$$
$$AD: y = 0.2x + 80$$
$$BC: y = 0.4x + 30$$

In order that polyamides may have a sufficient combination of transparency, melt shapeability, chemical resistance and softening temperature, it is essential that the composition ratio of each of the diamine and dicarboxylic acid components should be within the range surrounded by the above four lines. In case the relative viscosity of the polyamide is fixed to 2.0, in proportion to the increase in the ratio of bis(4-aminocyclohexyl)methane the melt viscosity of the polyamide increases, and on the boundary line AB (namely, the linear function of $x=50$) the melt viscosity at 300° C. is as high as 20,000 poises. A polyamide having a composition on the left side of the boundary line AB exhibits such a high melt viscosity that the polyamide cannot be conveniently shaped by customary injection molding procedures, though the melt viscosity may be lowered to some extent by, for instance, raising the molding temperature. Thus, it is important that the requirement of $x \leqq 50$ is satisfied. The "relative viscosity" used herein is a value measured in a solution of 1 g. of the polyamide in 100 cc. of 98% concentrated sulfuric acid, and the "melt viscosity" is a value measured by means of a Koka-type flow tester with nozzles of 1 mm. $\phi$ x 1 mm. under a load of 10 kg./cm.$^2$.

The boundary line BC (namely, the linear function of $y=0.4x+30$) is a line deciding the propriety of transparency in the polyamide. Namely, a polyamide having a composition under the line BC does not have any transparency. In case the composition is a little outside the boundary line BC, the transparency of the polyamide is greatly reduced and any intended transparent polyamide cannot be obtained. Accordingly, it is critical that the composition of the polyamide-constituting monomers should meet the requirement of $y \geqq 0.4x+30$.

The boundary line CD (namely, the linear function $y=10x$) is a line tracing a group of points where polyamides under the dried condition exhibit a softening temperature of 125° C. and under the saturated water absorption exhibit a softening temperature of 40° C.

Shaped articles from polyamides exhibiting a softening temperature lower than 40° C. under the saturated water absorption have strains in their interior and hence, they are easily deformed only by a long period contact with water, particularly in the summer season when the ambient temperature is very high. However, polyamides having a composition on the left side of the boundary line CD (namely, in the range of $y=10x$) exhibit a softening temperature higher than 40° C. under the saturated water absorption. The more the composition of a polyamide is spaced apart from the boundary line CD on its left side, the higher is the softening temperature of the polyamide and the greater resistance to high temperatures is given to the polyamide.

The "softening temperature" used herein is measured in accordance with Clash and Berg method (see modern Plastics, July 21, 1944, p. 119), and means the temperature at which the rigidity of the sample is abruptly lowered to $3 \times 10^3$ kg./cm.$^2$ when the temperature is raised at a rate of 10° C./min.

Since the polyamides of this invention are non-crystalline, the lowering in rigidity at the softening temperature is violent and it is substantially impossible to use them at a temperature exceeding the softening temperature.

The boundary line AD (namely, the linear function of $y=0.2x+80$) is a line deciding the propriety of the resistance to chemicals, particularly methanol, in the polyamide. Generally, the chemical resistance is greatly affected by the composition ratios of two dicarboxylic acids, as the ratio of the terephthalic acid is high, so the chemical resistance of the polyamide is improved. In other words, a polyamide having a composition above the boundary line AD is whitened in methanol at room temperature to lose its transparency and become fragile. Polyamides excellent in chemical resistance can be obtained by adjusting the composition of the polyamide-constituting monomers within the range defined by the inequality of $y \leqq 0.2x+80$.

According to the present invention, it is possible to obtain polyamides having a combination of excellent melt shapeability, excellent chemical resistance, excellent thermal stability and excellent transparency by adjusting the composition ratios of polyamide-constituting monomers so as to satisfy the above mentioned four inequalities.

Since the synthetic linear polyamide of this invention is highly polymeric, it is naturally essentially that it should consist of substantially equimolar amounts of the diamine and dicarboxylic acid components. Further, in view of mechanical strengths of resultant shaped articles it is very important that the polyamide has the above mentioned relative viscosity of at least 1.9. In case the relative viscosity is lower than the above critical value, shaped articles having sufficient mechanical strengths such as tenacity cannot be obtained. A relative viscosity $\eta_{rel.}$ ranging from 2.0 to 2.5 is particularly preferable for attaining the object of this invention.

The polyamide of this invention exhibits generally a melt viscosity at 300° C. of less than 30,000 poise, preferably less than 20,000 poise. In the polyamide of the present invention, the softening temperature under the saturated water absorption is generally higher than 40° C., preferably higher than 50° C.

The polyamide of this invention can be formed under the known polycondensation conditions as far as the composition ratios of the above mentioned four monomers are maintained within the range specified above.

Bis(4-aminocyclohexyl)methane to be used as diamine component in this invention usually takes a form of a mixture of three stereoisomers. In the present invention the mixing ratio of these isomers is not defined, and either of bis(4-aminocyclohexyl)methane which is solid or liquid at 25° C. may be used in the present invention.

In addition to isophthalic acid and terephthalic acid, functional derivatives of these acids may be used as monomers of the dicarboxylic acid component. As such functional derivatives there are cited their chlorides and phenylesters.

The polycondensation may be performed in accordance with known polymerization techniques, such as melt polymerization, solution polymerization and interfacial polymerization techniques, but in the present invention it is preferred to conduct the polycondensation in accordance with the melt polymerization procedures, so as to obtain polyamides having a high molecular weight. In the case of the melt polymerization, bis(4-aminocyclohexyl)methane, hexamethylene diamine, terephthalic acid and isophthalic acid are mixed in such amounts that the ratio of the diamine component and the dicarboxylic acid component will be substantially equimolar and that the composition of these four monomers will satisfy the above mentioned inequalities (I, (II), (III) and (IV), and they are heated at temperatures higher then the melting point of the resulting polyamide but lower than the degradation temperature thereof. More specifically, the heating temperature to be adopted is in the range of 200 to 330° C., preferably 250 to 300° C. The polymerization is performed in an inert atmosphere, for instance, in a nitrogen gas stream. The pressure is generally in the range of from atmospheric pressure to 30 atmospheres.

The method of addition of starting monomers is not defined in the present invention. For instance, a method may be adopted comprising preparing unit salts of a different combination of the diamine and dicarboxylic acid, mixing such unit salts so as to obtain a prescribed composition and subjecting the mixture to the polycondensation; or it is also possible to adopt a method comprising suspending a prescribed amount of a mixture of diamines into water, adding a prescribed amount of a mixture of dicarboxylic acids to the suspension at an elevated temperature to form a solution of a mixture of nylon salts, optionally decolorizing it by active carbon if necessary, and subjecting the solution to the polycondensation.

By way of example, the way of adding monomers will be explained below by referring to a polyamide having a composition shown by the symbol P within the range surrounded by lines AB, BC, CD and AD in the drawings.

30 mole percent of a salt of hexamethylene diamine and terephthalic acid, 30 mole percent of a salt of bis(4-aminocyclohexyl)methane and isophthalic acid, and 40 mole percent of hexamethylene diamine and isophthalic acid may be mixed together, and then the mixture may be subjected to the polycondensation; or 15 mole percent of bis(4-aminocyclohexyl)methane 35 mole percent of hexamethylene diamine, 35 mole percent of isophthalic acid and 15 mole percent of terephthalic acid may be gradually added into hot water to form a solution of a mixture of nylon salts, and the solution may be subjected to the polycondensation. In such cases, the composition of the resultant polyamide is substantially the same as the composition of the monomers fed to the polycondensation.

If necessary, a monovalent amine or organic acid may be added as viscosity adjuster to a mixture of starting nylon salts or an aqueous solution thereof in an amount of 1.2 to 0.2 mole per 100 moles of the starting nylon salts. It is also possible to add a diamine or a dicarboxylic acid for the same purpose in an amount of 0.6 to 0.1 mole per 100 moles of the starting nylon salts to the system.

Since polyamides prepared in accordance with this invention have a relatively low melt viscosity, this invention has an advantage that the melt polymerization can be performed with ease.

Further, the polyamide of this invention may be prepared by a method which comprises pre-condensing a suspension of a mixture of nylon salts in a polar solvent such as phenol or cresol to form a solution of a lowly polymeric condensate, and polycondensing the solution under reduced pressure at a high temperature while removing the solvent. The polyamide of this invention may be also prepared by a method comprising heat melting diphenyl esters of isophthalic acid and terephthalic acid in an inert gas atmosphere, adding to the melt a mixture of diamines in an amount substantially equimolar to the acids in the form of a phenol solution, and carrying out the polycondensation under reduced pressure at a high temperature while removing the phenol. Still further, the polyamide of this invention may be prepared by a method known as interfacial polycondensation method. This method comprises dissolving a mixture of diamines into water in the presence of sodium carbonate, separately dissolving isophthaloyl chloride and terephthaloyl chloride in carbon tetrachloride, chloroform, nitrobenzene or cyclohexane adding the acid chloride solution to the diamine solution under stirring in a manner such that the diamines and the acid chlorides may be substantially equimolar, and then carrying out the polycondensation at a low temperature. In each of the above exemplified methods, the diamine component consisting of bis(4-aminocyclohexyl)methane, and hexamethylene diamine, and the dicarboxylic acid component consisting of isophthalic acid and terephthalic acid or their functional derivatives should be subjected to the polymerization in a manner such that all of the above inequalities (I), (II), (III) and (IV) may be satisfied and that the diamine component and the dicarboxylic acid component may be substantially equimolar to each other.

In the preparation of the polyamide of the present invention, it is also possible to add a small amount of a straight chain aliphatic polyamide to the polycondensation system and obtain a copolymer. As such straight chain aliphatic polyamide, there may be used straight chain aliphatic ω-amino acids having from 4 to 12 carbon atoms or their lactams, and salts of straight chain dicarboxylic acids of from 2 to 10 carbon atoms and straight chain aliphatic diamines of from 2 to 12 carbon atoms or mixtures of such salts. Such straight chain aliphatic polyamide component is used in an amount of less than 20 parts by weight, preferably 5 to 15 parts by weight based on 100 parts of the polyamide of the present invention consisting of the above mentioned four monomers.

It is also possible to add to the polyamide of this invention various additives to be applied to ordinary polyamides, such as heat stabilizers, photo-stabilizers, antioxidants and pigments at an optional stage either before or after the polymerization in accordance with known recipes.

The polyamide of the present invention is excellent in transparency, chemical resistance, heat stability and melt shapeability, and hence is valuable as shaping material for the preparation of various shaped and molded articles such as films, plates, pipes, rods and containers of various types.

This invention will be explained more detailedly hereinbelow by referring to examples.

EXAMPLE 1

(A) An embodiment of the preparation of starting monomer salts 21.0 parts by weight of an isomeric mixture of bis(4-aminocyclohexyl)methane (which will be hereinbelow referred to as ACM) having a melting point of 45–46° C. were added to 500 parts of water, followed by agitation at a temperature of 90–95° C. to form an aqueous suspension. To this suspension were added 16.6 parts by weight of isophthalic acid (which will be hereinbelow referred to as I) over a period of time of 30 minutes. Then, one part by weight of active carbon was added to the mixture, and the agitation was continued at 90–95° C. for 30 minutes. The whole system was filtered at an elevated temperature, and the filtrate was condensed under reduced pressure and dried to obtain a white salt of ACM·I.

Separately, 116 parts by weight of hexamethylene diamine (which will be hereinbelow referred to as $A_6$) were dissolved into 100 parts by weight of water, and to the resulting solution, 166 parts by weight of I were added at a temperature of 60–70° C. under stirring over a period of time of 30 minutes, following which 3 parts by weight of active carbon were added to the system and the stirring was further continued for 30 minutes. The whole system was filtered at an elevated temperature, and the filtrate was condensed under reduced pressure and dried to form a white salt of $A_6 \cdot I$.

When terephthalic acid (which will be hereinbelow referred to as T) was used instead of isophthalic acid in the above procedures, a white salt of $A_6 \cdot I$ was prepared similarly.

21.0 parts by weight of ACM were added to 2000 parts by weight of water, and 16.6 parts by weight of T were added to the system under stirring over a period of time of 15 minutes. Then, 1 part by weight of active carbon was further added and the stirring was further continued for 30 minutes at a temperature of 90–95° C. The whole system was filtered at an elevated temperature, and the filtrate was condensed under reduced pressure and dried to form a white salt of ACM·T.

Thus, it is seen that white nylon salts can be easily synthesized by the neutralization reaction.

(B) An embodiment of the preparation of a polyamide

The following compounds were mixed together:

| | Parts by wt. |
|---|---|
| ACM·I | 94.1 |
| $A_6 \cdot I$ | 70.6 |
| $A_6 \cdot T$ | 141.2 |
| Benzoic acid | 1.2 |

The above composition corresponds to the case where $x$ and $y$ in the drawings are 25 mole percent and 50 mole percent, respectively.

To the mixture were added 30 parts by weight of water, and the system was transferred into a 30 mm. $\phi$ test tube and charged into an autoclave. The atmosphere inside the autoclave was fully replaced by nitrogen, and then, the heating was conducted to raise the temperature to 300° C. over a period of time of 3 hours, while the inner pressure was maintained at 20 atmospheres by removing nitrogen gas and steam from the autoclave. Then, the inner pressure was reduced to 200 mm. Hg over a period of time of three hours while the temperature was maintained at 300° C. After the system had been maintained at a pressure of 200 mm. Hg for 30 minutes, the heating was stopped and the whole system was cooled by allowing it to stand still. Then, the content was recovered. Thus, there was obtained a glass-like, transparent polyamide having a relative viscosity of 2.10. The melt viscosity at 300° C. of the polyamide was $10.2 \times 10^3$ poise. The sample plate of 1 mm. thickness and 5 mm. width compression molded from this polyamide exhibited an excellent tenacity. After the sample plate had been dipped in methanol at 25° C. for 24 hours, any change was hardly observed and it retained high moddulus of elasticity and transparency.

The sample plate of 1 mm. thickness, after having been dipped into water at 30° C. for 30 days, exhibited a softening temperature of 64° C.

EXAMPLES 2 TO 10 AND CONTROLS 1 TO 7

From salts prepared in accordance with Example 1–A, various polyamides were synthesized in the same manner as in Example 1–B by varying the composition ratio of each salt with respect to $x$ and $y$ as shown in Table I. In similar manners as described in Example 1–B, each polyamide was evaluated with respect to melt viscosity, and mechanical strength.

The results are shown in Table I below.

raised to 280° C. under reduced pressure. This condition was maintained for 3 hours, and thereafter the content of the flask was cooled. As a result, there was obtained a transparent polyamide having a relative viscosity $\eta_{rel.}$ of 2.11.

EXAMPLE 12

In a 1-litre capacity stirrer-equipped flask, 4.20 g. (0.02 mole) of bis(4-aminocyclohexyl)methane, 9.27 g. (0.08 mole) of hexamethylene diamine and 22.30 g. (0.21 mole) of sodium carbonate were dissolved into 200 ml. of water. A solution of 16.25 g. (0.08 mole) of isophthaloyl chloride and 4.06 g. (0.02 mole) of terephthaloyl chloride in 200 ml. of nitrobenzene was added into the flask under violent stirring. Although the polymer was instantly isolated, the stirring was continued for one hour, followed by filtration, washing and drying. The resultant polymer exhibited a relative viscosity $\eta_{rel.}$ of 1.93.

What we claim is:

1. A synthetic linear polyamide consisting essentially of a polycondensate from substantially equimolar amounts of a diamine component consisting of bis(4-aminocyclohexyl)methane and hexamethylene diamine, and a di-

TABLE I.—COMPOSITIONS AND PROPERTIES OF POLYAMIDES

| Example No. | Composition, mole percent | | Softening temperature (° C.)[1] | Relative viscosity ($\eta_{rel}$) | Melt viscosity (poise) at 300° C. | Yield strength (kg./cm.[2]) | Elongation at break (percent) | Izod impact strength (kg./cm./cm.) | Breakage due to fragility |
|---|---|---|---|---|---|---|---|---|---|
| | $x$ | $y$ | | | | | | | |
| Control 1 | 20 | 100 | 53 | 2.10 | $5.8 \times 10^3$ | | | | |
| Example 2 | 20 | 80 | 55 | 2.13 | $6.2 \times 10^3$ | 970 | 80 | 4.2 | 0/5 |
| Example 3 | 20 | 60 | 58 | 2.12 | $6.3 \times 10^3$ | 985 | 82 | 3.7 | 0/5 |
| Example 4 | 20 | 40 | 63 | 2.20 | $8.5 \times 10^3$ | 990 | 87 | 4.8 | 0/5 |
| Control 2 | 20 | 20 | | 2.12 | $6.8 \times 10^3$ | | | | |
| Control 3 | 0 | 60 | 33 | 2.21 | $2.7 \times 10^3$ | | | | |
| Example 5 | 10 | 60 | 45 | 2.18 | $5.0 \times 10^3$ | 985 | 123 | 5.6 | 0/5 |
| Example 6 | 20 | 60 | 58 | 2.12 | $6.3 \times 10^3$ | | | | |
| Example 7 | 30 | 60 | 71 | 2.21 | $18 \times 10^3$ | 990 | 68 | 3.9 | 0/5 |
| Example 8 | 30 | 60 | | 2.05 | $11 \times 10^3$ | 980 | 53 | 4.0 | 0/5 |
| Example 9 | 30 | 60 | | 1.92 | $6.0 \times 10^3$ | 985 | 47 | 2.7 | 2/5 |
| Example 10 | 50 | 60 | 97 | 2.10 | $29 \times 10^3$ | 1,020 | 39 | 3.5 | 0/5 |
| Control 4 | 50 | 60 | | 1.85 | $18 \times 10^3$ | | 6.5 | 1.2 | 5/5 |
| Control 5 | 70 | 60 | <100 | 2.22 | $150 \times 10^3$ | | | | |
| Control 6 | 70 | 60 | | 2.04 | $79 \times 10^3$ | | | | |
| Control 7 | 70 | 60 | | 1.91 | $43 \times 10^3$ | | | | |

[1] Under saturated water absorption.
[2] "Breakage due to fragility" indicates the number of pieces which are fragile per 5 pieces.

Results of Examples 7 to 11 and Controls 5 to 7 show the criticality of the boundary line AB. When the comparison is made with respect to polyamides of the same relative viscosity, the greater becomes the value of $x$, the higher becomes the value of the melt viscosity, and the relative viscosity of 2.0 corresponds to the melt viscosity at 300° C. of $20 \times 10^3$ poise in a polyamide having a composition on the boundary line AB. In a polyamide having a composition on the left side of the boundary line AB, the intended relative viscosity or melt viscosity cannot be attained. Such polyamide is not practical in view of difficulties in handling in a polymerization vessel or difficulties at injection molding because of its poor flowability.

Results of Examples 7 to 10 and Control 4 shows the criticality of the relative viscosity in the polyamide of this invention. From these results it is seen that polyamides having a sufficient tenacity can be obtained by adjusting the relative viscosity $\eta_{rel.}$ to at least 2.0.

EXAMPLE 11

A stirrer-equipped flask was charged with 25.44 g. (0.08 mole) of diphenyl isophthalate and 6.37 g. (0.02 mole) of diphenyl terephthalate, and they were heat melted at 200° C. in a nitrogen atmosphere. A solution of 4.20 g. (0.02 mole) of bis(4-aminocyclohexyl)methane and 9.27 g. (0.08 mole) of hexamethylene diamine in 30 ml. of phenol was gradually added to the content of the flask, while the content being well stirred. After completion of the addition, the heating at 200° C. was continued for 8 hours in a nitrogen stream. Then, the temperature was carboxylic component consisting of terephthalic acid and isophthalic acid, the composition ratio of the diamine component and the dicarboxylic acid component being within a range specified by the following formulas $$x \leq 50 \tag{I}$$
$$y \leq 10\,x \tag{II}$$
$$y \leq 0.2\,x + 80 \tag{III}$$

and $$y \geq 0.4\,x + 30 \tag{IV}$$

wherein $x$ represents the mole percentage of bis(4-aminocyclohexyl)methane in the diamine component and $y$ represents the mole percentage of isophthalic acid in the dicarboxylic acid component, said polyamide having a relative viscosity $\eta_{rel.}$, measured in a solution of 1 g. of the polyamide in 100 cc. of 98% concentrated sulfuric acid at 25° C., of at least 1.9.

2. The synthetic linear polyamide of claim 1, which has a relative viscosity of from 2.0 to 2.5.

References Cited

UNITED STATES PATENTS

| 2,512,606 | 6/1950 | Bolton et al. | 260—78 |
| 2,516,585 | 7/1950 | Pease | 260—78 |
| 2,696,482 | 12/1954 | Pease | 260—78 |
| 3,393,210 | 7/1968 | Speck | 260—78 |

HAROLD D. ANDERSON, Primary Examiner

U.S. Cl. X.R.

260—30.8R